United States Patent [19]

Sumimoto

[11] 4,435,287

[45] Mar. 6, 1984

[54] APPARATUS FOR FILTRATION OF LUBRICATING OIL FOR AN INTERNAL COMBUSTION ENGINE

[75] Inventor: Morio Sumimoto, Kanagawa, Japan

[73] Assignee: Kabushiki Kaisha Sumimoto Kagaku Kenkyusho, Kanagawa, Japan

[21] Appl. No.: 486,454

[22] Filed: Apr. 25, 1983

Related U.S. Application Data

[63] Continuation of Ser. No. 343,907, Jan. 29, 1982, abandoned.

[30] Foreign Application Priority Data

Feb. 6, 1981 [JP] Japan .................................. 56-17166

[51] Int. Cl.³ ........................ B01D 27/10; B01D 35/14
[52] U.S. Cl. ................................. 210/131; 210/168; 210/232; 210/350; 210/434; 210/436; 210/472
[58] Field of Search ............... 210/130, 131, 137, 168, 210/238, 350, 351, 352, 433.1, 434, 436, 472

[56] References Cited

U.S. PATENT DOCUMENTS

| | | | |
|---|---|---|---|
| 1,477,947 | 12/1923 | Ensign | 210/434 |
| 2,364,240 | 12/1944 | Parry | 210/352 |
| 2,554,016 | 5/1951 | Czarnecki | 210/436 |
| 2,575,995 | 11/1951 | Briggs | 210/434 |
| 2,753,047 | 7/1956 | Kettlewell | 210/350 |
| 3,165,469 | 1/1965 | Bruns | 210/436 |
| 3,233,737 | 2/1966 | Hultgren | 210/434 |
| 3,319,790 | 5/1967 | Lindberg | 210/352 |
| 3,375,931 | 4/1968 | Sorenson | 210/350 |
| 3,528,554 | 9/1970 | Ogden | 210/352 |
| 3,727,764 | 4/1973 | Ogden | 210/232 |

*Primary Examiner*—Ernest G. Therkorn

[57] ABSTRACT

This invention relates to an apparatus for filtration of lubricating oil which lubricates an internal combustion engine as used in an automobile, a ship, etc. A filter element which is made of filter paper accumulated in layers and a pressure-receiving plate which receives pressure loaded on the lubricating oil during the operation of the internal combustion engine are provided in the filtration apparatus wherein the pressure-receiving plate compresses the filter element in compliance with pressure variations so as to prevent a leak passage from being formed by partial transformation of the filter element.

7 Claims, 8 Drawing Figures

APPARATUS FOR FILTRATION OF LUBRICATING OIL FOR AN INTERNAL COMBUSTION ENGINE

This application is a continuation of application Ser. No. 343,907 filed Jan. 29, 1982, now abandoned.

BACKGROUND OF THE INVENTION

An apparatus for filtration is well-known in which foreign matter contained in liquid is removed by adhering to fiber of filter paper while the liquid passes through filtration passages which are gaps between the layers of the filter paper.

When incorporating such filtration apparatus in a circuit for filtration of lubricating oil for an engine used in an automobile or a ship, the filter element is placed under high pressure at the time of starting or rapid acceleration of the engine or at a time when a by-pass circuit is out of order. As a result, the filter element is partially crushed under pressure and gets wrinkled, so that a leak passage for the liquid is created in a part of the filter element.

In comparison with the size of the impurities, the thus formed leak passage is an extremely gigantic passage, through which the impurities can freely pass, resulting in proper filtration being made impossible.

Furthermore, in the filtration circuit for lubricating oil for an engine used in an automobile or a ship, air leaks into the circuit when the engine stops. Thus, because air leaks into the filtration circuit the lubricating oil is recontaminated when the air turns into foam with a rise in pressure in the circuit and the foam mixes in the lubricating oil and passes through gaps between the layers of the filter element, thereby driving away and setting free sludge which has been removed from the liquid adherence to the fiber of the filter element.

SUMMARY OF THE INVENTION

Accordingly, it is an object of the present invention to provide a filtration apparatus which prevents a filter element from getting wrinkled and forming a leak passage when an abnormally high pressure is produced in liquid to be filtered, by placing a pressure-receiving plate on the filter element made of filter paper in layers so as to compress the filter element in accordance with pressure variations.

It is another object of the present invention to provide a filtration apparatus having a passageway for releasing air in the pressure-receiving plate and a filter element in mutual communication therewith for the purpose of releasing the pressure on the liquid to be filtered, so as to prevent air, which comes in when an engine stops, from turning into foam when the pressure rises due to the restriction of the liquid flow by the compression of the filter element by the pressure-receiving plate, and thus preventing foam from mixing into and moving with the lubricating oil, thereby setting free adhering sludge. Because the excess pressure of the liquid to be filtered is released through the passageway for releasing air, advantages can be realized in that a casing does not need to be created with a space for absorbing the pressure rise of the liquid and that miniaturization of the whole filtration apparatus including the casing is made possible.

It is a further object of the present invention to provide a filtration apparatus in which the diameter of an air-release hole is limited to less than a certain length so that the quantity of liquid to be filtered which leaks away through the hole without being filtered can be practically ignored in comparison with the total quantity of liquid flowing through the filtration circuit.

It is still a further object of the present invention to provide a filtration apparatus which is convenient to handle, by including a replaceable cartridge case receiving therein a filter element and a pressure-receiving plate.

It is still a further object of the present invention to provide a filtration apparatus which prevents lubricating oil from decreasing in quantity and deteriorizing in quality, as it is used, by including a replaceable cartridge case containing new lubricating oil and additive for replacing lost oil as well as a filter element and a pressure-receiving plate.

Other and further objects and advantages of the present invention will become apparent from the description of the preferred embodiment with reference to the accompanying drawings.

DESCRIPTION OF THE PREFERRED EMBODIMENT

Figure 1:
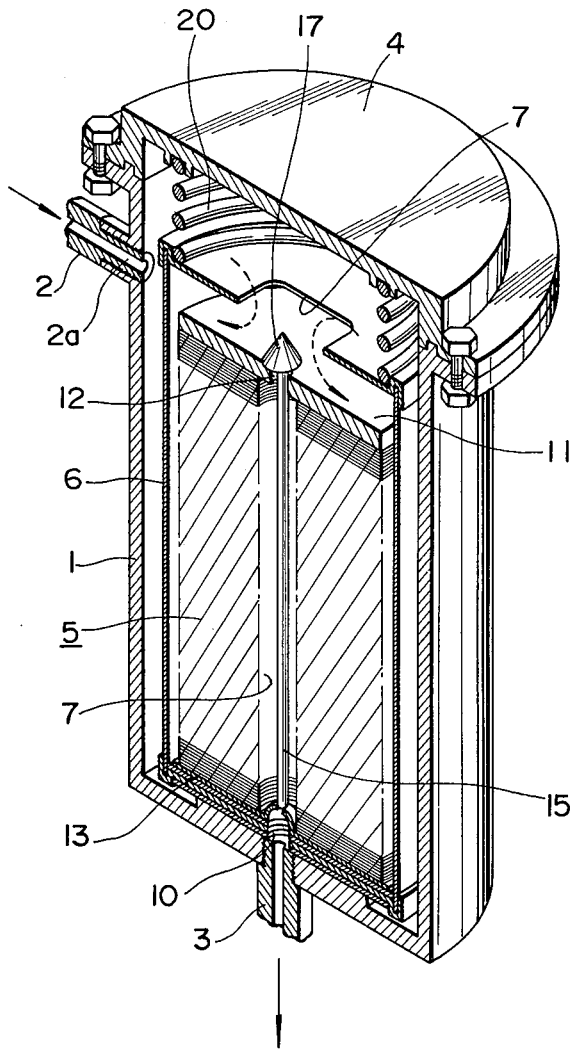
FIG. 1 is a vertical sectional perspective view of an apparatus for filtration according to the present invention.

Referring to FIG. 1, numeral 1 indicates a cylindrical body casing having an open top and made of a pressure-proof container. The body casing 1 is incorporated in a circuit for filtration of lubricating oil for an automobile's engine by connecting it to an inlet pipe 2 for liquid on one lateral wall and to an outlet pipe 3 for filtrate, namely filtered liquid, on a bottom center thereof. The body casing 1 is covered on its top with a lid 4 for maintaining the density of liquid.

Numeral 5 indicates a filter element comprising a lot of filter paper accumulated in layers. The filter element 5 received inside a cartridge case 6 is detachable from the body casing 1. The filter element 5 is provided with a filtrate outlet passageway 7 vertially extending through the center thereof. The cartridge case 6 holds the filter element 5 without transforming it. As for the cartridge case 6, an aluminum can is appropriate and the case does not need to be pressure-proof and can be substantially non-flexible. The cartridge case 6, before use, is in the shape of a can sealed on the upper and lower surfaces, on the upper surface is provided an opening device which is riped off so as to open an upper aperture 9 and on the lower surface is provided a lower aperture 10 which is opened by insertion of a needle which is pre-fixed inside the body casing 1 and is in communication with the outlet pipe 3 for filtrate.

Numeral 11 of FIG. 1 indicates a pressure-receiving plate placed on top of the filter element 5 and having an air-release hole 12 bored at the center thereof in communication with the filtrate outlet passageway 7 bored through the center of the filter element 5. Furthermore, a rigid supporting plate 13 is located under the bottom of the filter element 5. The supporting plate 13 has a central hole 14 at the center thereof, the central hole 14 communicating with the lower end of the filtrate outlet passageway 7 to the lower aperture 10 of the cartridge case 6. Numeral 15 represents a connection rod vertically extending through the filtrate outlet passageway 7. The lower end of the connection rod 15 is attached to the center of an upper surface of the supporting plate 13 by appropriate leg portions 16, shown in FIG. 2, so as not to block the central hole 14 while the upper portion extends through the above the air-release hole 12 of the pressure-receiving plate 11; and the upper end is provided with a stopper 17 to prevent the pressure-receiving plate 11 from comming off the filter element 5. The filter element 5 has accumulated layers held between the supporting plate 13 and the pressure-receiving plate 11 by the connection rod 15 passing therethrough.

Figure 2:
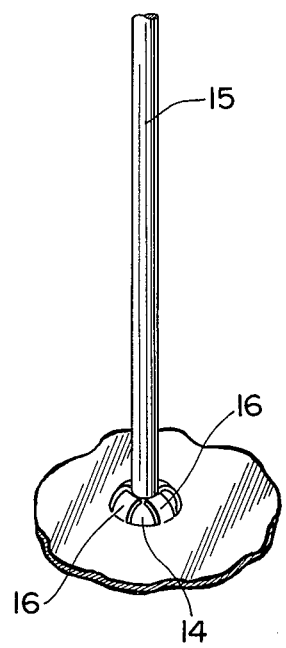
FIG. 2 is a perspective view of a connection rod.

As shown in FIG. 2, by forming the air-release hole 12 in the pressure-receiving plate 11, air, which comes into the body casing 1 when an engine stops, flows through the air-release hole 12 into the filtrate outlet passageway 7 and then to the outlet pipe 3 without turning into foam when the engine re-starts, thereby resulting in no possibility that sludge adhering to the filter element returns into the oil as a result of the production of foam. Furthermore, high pressure, which results at the time of starting or rapid acceleration of an engine or at the time when a by-pass circuit is out of order, compresses the filter element 5 via the pressure-receiving plate 11 and at the same time the pressure is released through the air-release hole 12. As a result, there is no necessity of providing in the body casing 1 a space for absorbing high pressure and miniaturization of the filtration apparatus including the body casing is facilitated. In addition, the connection rod 15 extending through the filter element 5 is being held by the pressure receiving plate 11 and the supporting plate 12, so that the flter element 5 will not get out of shape nor go out of order and therefore will be very easy to handle.

Figure 3:
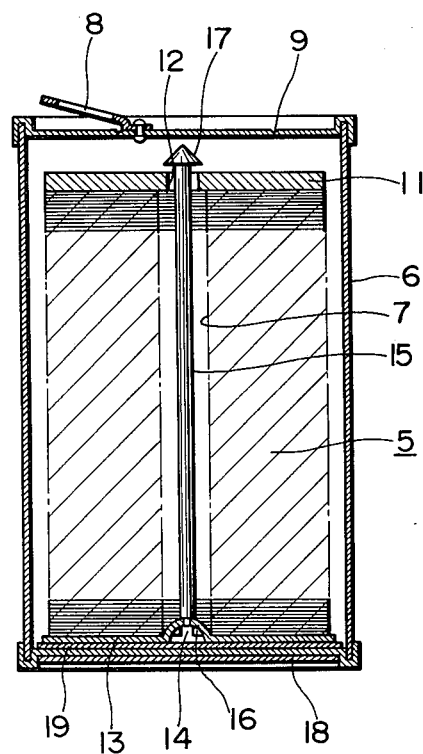
FIG. 3 is a perspective view of a filtration element, a pressure-receiving plate, a supporting plate, a connection rod and cartridge case.

Referring to FIG. 3, numeral 18 indicates filter paper fixed at the bottom of the cartridge case 6. When the cartridge case 6 is received inside the body casing 1 (FIG. 1), the filter paper lies between the inner surface of the bottom of the body casing 1 and the bottom of the cartridge case 6 and acts as packing. Rubber packing material could be used instead of the filter paper, but with rubber packing material, sludge adheres to the outer circumferential surface and, when taking the cartridge case 6 out of the body casing 1, the rubber packing material remains inside the body casing 1, thereby causing the inconvenience of getting one's hand dirty in order to take out the thus remaining rubber packing material. However, if the filter paper 18 is fixed at the bottom of the cartridge case 6, the filter paper very favorably acts as a filter in its earlier stage and, then, acts as packing as it is clogged. In addition, because the filter paper is fixed at the bottom of the cartridge case 6, no special cleaning inside the body casing 1 is required. Similar filter paper 19 is provided between the supporting plate 13 and the inner surface of the bottom of the cartridge case 6.

Numeral 20 of FIG. 1 indicates a fixing spring spreading between the upper surface of the cartridge case 6 and the lid 4 so as to prevent the cartridge case 6 from shaking when received inside the body casing 1. The spring 20 presses the cartridge case 6 against the bottom of the body casing 1.

Figure 4:
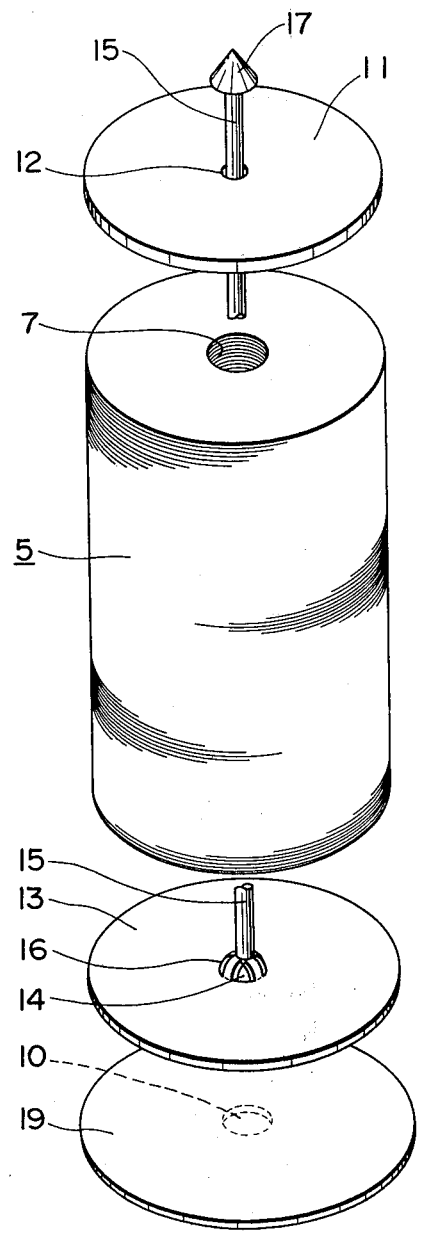
FIG. 4 is an exploded perspective view of a portion of FIG. 3.

It is sufficient that the diameter of the air-release hole 12 (FIG. 1) bored in the pressure-receiving plate 11 is less than that of an inlet hole 2a of the inlet pipe 2 for the liquid to be filtered. As shown in FIG. 4, in order to provide a sectional square measure or area corresponding to a required hole diameter, the sectional square measure of the air-release hole 12 can be substantially restricted by appropriately choosing the diameter of the connection rod 15 extending through the air-release hole 12. Such restriction of the sectional square measure or area of the air-release hole 12 by means of the connection rod 15 will make it possible to practically enlarge the air-release hole 12 and aid in manufacturing.

However, it is to be noted that, of course, the connection rod 15 does not always need to restrict the diameter of the hole. In the place of the connection rod 15, a line-shaped or cord-shaped article can be used and having no connection rod at all will also work.

When applying a filtration apparatus in which the inlet hole 2a (FIG. 1) and the air-release hole 12 are 2 mm and 1 mm in diameter, respectively, to a filtration circuit for lubricating oil for an automobile's engine, at the time of idling of an engine having an operational oil pressure of 0.6 kg/cm$^2$ (at about 1,000 rpm), it took 60 seconds for a liter of liquid to flow into the filtration apparatus having no air-release hole 12 while it took 53 seconds for the same liquid to flow into the filtration apparatus having the air-release hole of 1 mm in diameter. Furthermore, at 2,000 rpm when the operational oil pressure is 1 kg/cm$^2$, it took 39 seconds per liter when no air-release hole and 33 seconds per liter when the air-release hole is 1 mm in diameter, and it is to be noted that the inflow of liquid increases 10% to 15% when the air-release hole 12 of the present application exists as compared with no hole. Thus the increased flow is recognized as the quantity of liquid which flows directly through the apparatus via the air-release hole 12 without being filtered. It has been confirmed that the quantity of lubricating oil filtered through a filtration apparatus is about 3% of the quantity of lubricating oil pumped by an engine pump. Thus, even if 10% to 15% of the lubricating oil flows through the filtration apparatus without being filtered as mentioned above, the unfiltered oil is about 0.3% to 0.45% of the total quantity of lubricating oil pumped and therefore is a quantity which can be ignored.

Impurities such as products of combustion, soot, moisture, dust, abrasion powder, etc. mix with the lubricating oil every moment during the operation of an automobile's engine and the impurities are filtered by the filter element 5. After the cartridge case 6 is filled with these impurities, the lid 4 is opened and the filled cartridge case 6 is taken out so as to be replaced with a new cartridge case 6. The new cartridge case 6 contains new lubricting oil and additive for replacing lost oil and additive, along with a new filter element. The old cartridge case can be destroyed by fire.

When the invention is used with a gasoline engine, oil to be supplied in the cartridge case 6 is high in viscosity and alkaline value so as to restore a loss in viscosity and alkalinity. On the contrary, when used with a diesel engine, oil to be supplied in the cartridge case 6 is low in viscosity since lubricating oil for this type of engine rises in viscosity.

After applying the filtration circuit including the filtration apparatus of the present invention to the filtration circuit for an automobile's engine circulating four liters of lubricating oil, the following results were obtained.

in the following table 3. The oil used is C type heavy oil.

TABLE 3

| Tanker Oil Samples | No. 1 | No. 2 | No. 3 | No. 4 | No. 5 |
|---|---|---|---|---|---|
| place where sample was taken | storage tank | second strainer | second strainer | second strainer | filter exit |
| lubricating period (hour) | 0 | 3 | 165 | 794–40 | 800 |
| specific gravity @ 15/4° C. | 0.9060 | 0.9063 | 0.9069 | 0.9099 | 0.9096 |
| flashing point (PM) °C. | 234 | 224 | 228 | 236 | 244 |
| dynamic viscosity (cSt) @ 40° C. | 108.4 | 107.0 | 107.8 | 111.3 | 110.4 |
| total acid value (JISK 2501) potential difference method mg KOH/g | 1.59 | 2.12 | 2.69 | 2.90 | 2.83 |
| total basic value (JISK 2501) | | | | | |
| hydrochloric acid method mg KOH/g | 30.16 | 30.96 | 28.58 | 19.19 | 21.37 |
| perchloric acid method mg KOH/g | 32.25 | 31.24 | 30.30 | 28.68 | 29.00 |
| residual carbon (wt %) | 3.62 | 3.51 | 3.46 | 3.78 | 3.51 |
| sulfuric acid ash (wt %) | 4.86 | 4.14 | 4.13 | 3.96 | 3.93 |
| moisture | Trace | Trace | Trace | Trace | Trace |
| insoluble (A method) | | | | | |
| n-pentane (wt %) | 0.00 | 0.20 | 0.17 | 0.13 | 0.06 |
| toluene (wt %) | — | 0.11 | 0.14 | 0.08 | 0.05 |
| insoluble (B method) | | | | | |
| n-pentane (wt %) | 0.00 | 0.22 | 0.22 | 0.42 | 0.88 |
| toluene (wt %) | — | 0.18 | 0.17 | 0.36 | 0.27 |

TABLE 1

| Test Vehicle | Travel before test starts (km) | Acid value of oil when test starts | Travel during test (km) | Acid value after test travel | Oil supplied during test (liter) | Times of replacement of cartridge case |
|---|---|---|---|---|---|---|
| No. 1 | 62,101 | 0.46 | 83,029 | 0.46 | 15.5 | 8 |
| No. 2 | 122,013 | 0.46 | 99,940 | 0.46 | 10.0 | 8 |
| No. 3 | 63,574 | 0.47 | 109,423 | 1.08 | 11.0 | 9 |
| No. 4 | 40 | 0.47 | 86,968 | 0.99 | 8.0 | 7 |

Referring to the above table 1, the vehicles No. 1 and No. 2 are provided with engines having 1,800 cc displacement while vehicles No. 3 and No. 4 are provided with engines having 2,000 cc displacement and the cartridge cases 6 are replaced approximately every 10,000 km. The results of analyzing the lubricating oil of vehicle No. 3 which travelled more than 100,000 km are shown in the following table 2, wherein it was found that there was little change in the quality of the lubricating oil. As a result, the lubricating oil was capable of continuous use. This was the same with other vehicles No. 1, No. 2 and No. 4.

TABLE 2

| Test Vehicle No. 3 | new oil 0 km/h | 26,000 km/h | 51,900 km/h | 82,976 km/h | 109,423 km/h |
|---|---|---|---|---|---|
| specific gravity | 0.8994 | 0.8996 | 0.9002 | 0.9014 | 0.9024 |
| total acid value | 0.47 | 0.78 | 0.72 | 1.02 | 1.08 |
| viscosity sec 0° C. | 94.3 | 94.6 | 96.4 | 97.6 | 98.9 |
| flash point | 254° C. | 232° C. | 234° C. | 218° C. | 232° C. |
| moisture | 0 | Trace | Trace | Trace | Trace |
| reaction | Neutral | Neutral | Neutral | Neutral | Neutral |

Figure 5:
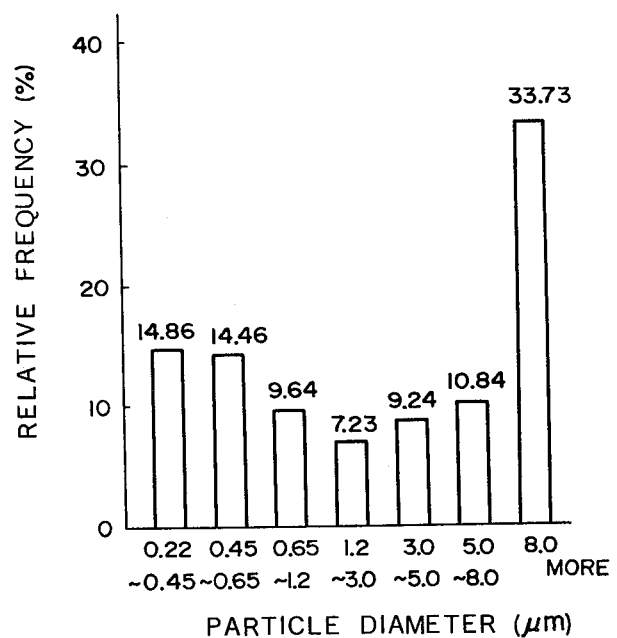
FIGS. 5-8 are charts showing particle distribution of sludge contained in lubricating oil for a dynamo engine used in a ship.
Figure 6:
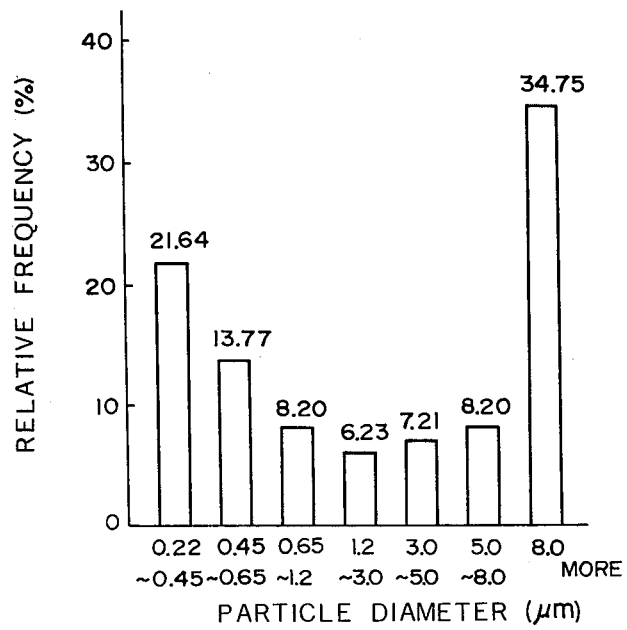
Figure 7:
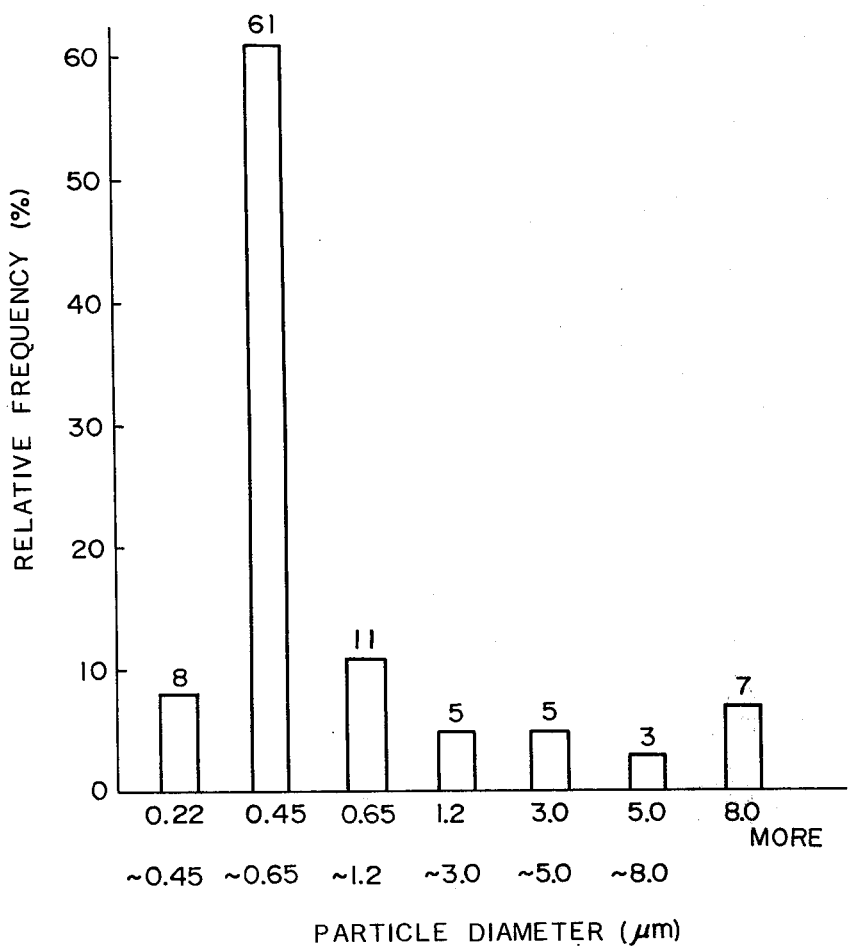
Figure 8:
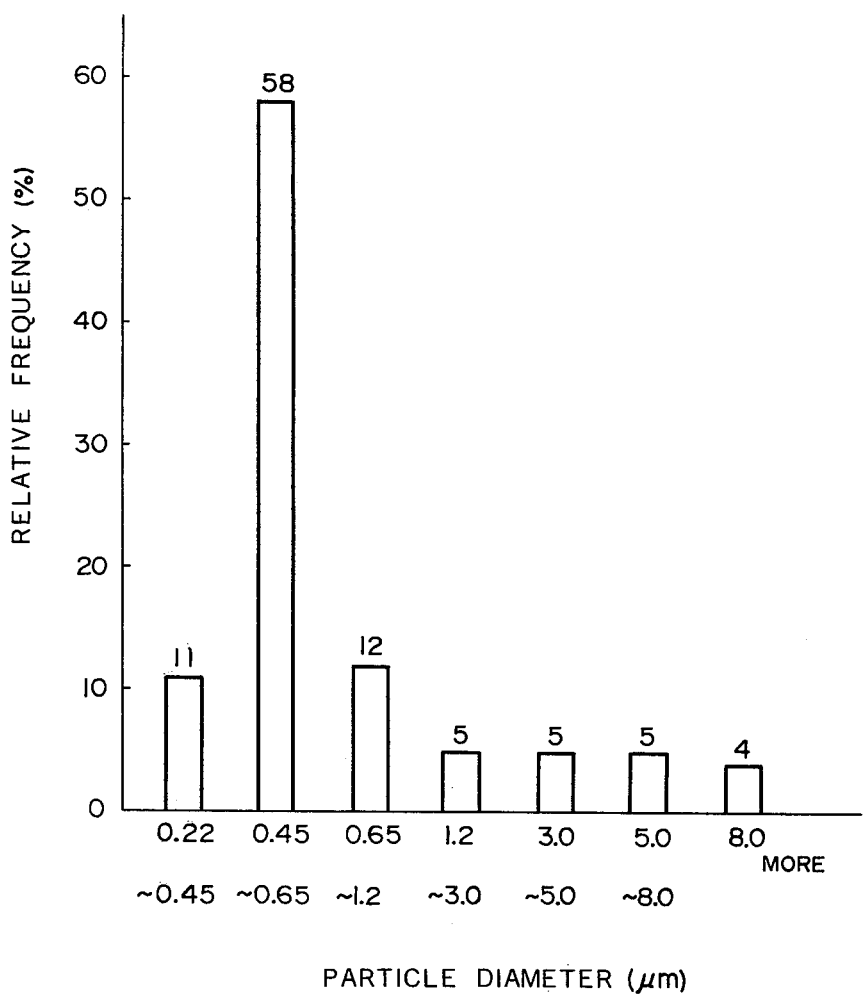

After applying the filtration circuit including the filtration apparatus of the present invention to the filtration of lubricating oil for a dynamo engine used in a tanker named "Dai Ni Asia Maru" owned by Mitsui Kisen Kabushiki Kaisha, the obtained results are shown The above table 3 clarifies that there is no big change, except that the insoluble shown in the data of samples No. 2 and No. 3 suddenly increased in comparison with that shown in the data of simple No. 1. It is thought that this increase was due to the sludge which separated from oil-coolers or pipes to which it previously adhered, and not due to the sludge or carbon which mixed in after the oil was changed. This is apparent from charts shown in FIGS. 5 and 6. Namely, in view of the particle distribution of the insoluable (Milli Pore Filter Method), particles larger than 8 μm comprise more than 30% of the total, and other particles comprise 10% to 20% of the total on the average. FIG. 5 and FIG. 6 are charts showing particle distribution according to the data of samples No. 2 and No. 3, respectively. FIG. 7 and FIG. 8 described below are charts showing particle distribution according to the data of samples No. 4 and No. 5, respectively.

The analyzed values of the data sampled after operation for 794 hours and 40 minutes are shown as the analyzed value of No. 4 sample data in the above table 3 and the chart in FIG. 7. When comparing this No. 4 sample data with No. 3 sample data which show the analyzed value after the operation for 165 hours, it has been found that the concentration of particles larger than 8 μm dramatically decreased to 7% of the total while the particles of 0.45 μm to 0.65 μm occupied 61% of the total particles. From this, it can be understood that a purpose of removing sludge particles larger than 1 μm was obtained.

No. 5 sample data shown in the above table 3 and in the chart of FIG. 8 show the analyzed values and particle distribution of lubricating oil sampled at the exit of the filtrate outlet passage 7 of the filtration apparatus of the present invention after operation for 800 hours in the tanker. The effects of adding alkaline were especially studied. Alkaline value was 19.19 in the No. 4 sample data while it was restored to 21.37 according to No. 5 sample data. Furthermore, the substantial removal of insoluble, e.g., n-pentane by the A method, can be recognized as shown by comparing the figures 0.13 and 0.06, and it is obvious that the edges of cleanness of the oil was elevated on the whole including the percentage of particles of 8 μm when comparing FIG. 7 and FIG. 8.

What is claimed is:

1. An apparatus for the filtration of lubricating oil for an internal combustion engine, comprising:
    a filter element having horizontal and vertical axes, upper and lower surfaces, and made of paper accumulated in horizontal layers between which filtrate passes and having a filtrate outlet passageway vertically through the center thereof;
    a body casing provided with said filter element therein;
    an inlet pipe for liquid to be filtered;
    an outlet pipe for filtrate, said inlet pipe and said outlet pipe being connected to said body casing, said outlet pipe being in communication with the filtrate outlet passageway of said filter element;
    a pressure-receiving plate located on the upper surface of the said filter element such that the pressure of the liquid is exerted thereon to compress said filter element and provided with an air and oil release hole therein, and said air and oil release hole being in communication with said filtrate outlet passageway and smaller in area than said inlet hole of said inlet pipe; and
    a replaceable cartridge case, said filter element and said pressure-receiving plate being positioned inside said replaceable cartridge case, said replaceable cartridge case having upper and lower surfaces provided with an inlet aperture for liquid to be filtered and an outlet aperture in communication with said filtrate outlet passageway of said filter element, respectively, being substantially non-flexible and being prefilled with lubricating oil and additive.

2. An apparatus for filtration as recited in claim 1, further comprising:
    a supporting plate abutting the lower surface of said filter element;
    a connecting rod abutting the lower surface of said supporting plate and passing through the filtrate outlet passage way of said filter element and through the air and oil release hole in said pressure receiving plate; and
    a stopper attached to the upper end of said connecting rod, holding said pressure receiving plate against said filter element, and allowing air to pass from and oil to pass into the filtrate outlet passage way when said filter element is compressed.

3. An apparatus for filtration as recited in claim 2, wherein said replaceable cartridge case has a tear open top which exposes the inlet aperture and a puncturable bottom aperture in communication with the outlet aperture.

4. An apparatus for filtration as recited in the claim 3, further comprising filter paper fixed to the bottom of said replacable cartridge case.

5. An apparatus for the filtration of lubricating oil for an internal combustion engine, comprising:
    a filter element having horizontal and vertical axes, upper and lower surfaces, and made of paper accumulated in horizontal layers between which filtrate passes and having a filtrate outlet passageway vertically through the center thereof;
    a body casing provided with said filter element therein;
    an inlet pipe for liquid to be filtered;
    an outlet pipe for filtrate, said inlet pipe and said outlet pipe being connected to said body casing, said outlet pipe being in communication with the filtrate outlet passageway of said filter element;
    a pressure-receiving plate located on the upper surface of the said filter element such that the pressure of the liquid is exerted thereon to compress said filter element and provided with an air and oil release hole therein, said air and oil release hole being in communication with said filtrate outlet passageway and smaller in area than said inlet hole of said inlet pipe;
    a replaceable cartridge case, said filter element and said pressure-receiving plate being positioned inside said replaceable cartridge case, said replaceable cartridge case having upper and lower surfaces provided with an inlet aperture for liquid to be filtered and an outlet aperture in communication with said filtrate outlet passageway of said filter element, respectively, and being prefilled with lubricating oil and additive;
    a supporting plate abutting the lower surface of said filter element;
    a connecting rod abutting the lower surface of said supporting plate and passing through the filtrate outlet passage way of said filter element and through the air and oil release hole in said pressure receiving plate; and
    a stopper attached to the upper end of said connecting rod, holding said pressure receiving plate against said filter element, and allowing air to pass from and oil to pass into the filtrate outlet passage way when said filter element is compressed.

6. An apparatus for filtration as recited in claim 5, wherein said replaceable cartridge case has a tear open top which exposes the inlet aperture and a puncturable bottom aperture in communication with the outlet aperture.

7. An apparatus for filtration as recited in claim 6, further comprising filter paper fixed to the bottom of said replaceable cartridge case.

* * * * *

UNITED STATES PATENT AND TRADEMARK OFFICE
CERTIFICATE OF CORRECTION

PATENT NO. : 4,435,287
DATED : March 6, 1984
INVENTOR(S) : Morio Sumimoto

It is certified that error appears in the above-identified patent and that said Letters Patent is hereby corrected as shown below:

Column 1, line 37, after "liquid", insert --by--.

Column 2, line 51, "vertially" should be --vertically--;

line 59, "riped" should be --ripped--.

Column 3, line 12, delete "above the";

line 39, "flter" should be --filter--.

Column 7, line 1, "edges" should be --degree--.

Column 8, line 5, "replacable" should be --replaceable--.

Signed and Sealed this

Thirtieth Day of October 1984

[SEAL]

Attest:

GERALD J. MOSSINGHOFF

Attesting Officer

Commissioner of Patents and Trademarks